(12) United States Patent
Vasseur et al.

(10) Patent No.: US 9,264,349 B2
(45) Date of Patent: Feb. 16, 2016

(54) DYNAMIC ENABLING OF ROUTING DEVICES IN SHARED-MEDIA COMMUNICATION NETWORKS

(75) Inventors: Jean-Philippe Vasseur, Saint Martin Duriage (FR); Shmuel Shaffer, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 710 days.

(21) Appl. No.: 13/176,253

(22) Filed: Jul. 5, 2011

(65) Prior Publication Data

US 2013/0010590 A1 Jan. 10, 2013

(51) Int. Cl.
*H04L 12/715* (2013.01)
*H04L 12/721* (2013.01)
*H04W 40/32* (2009.01)

(52) U.S. Cl.
CPC ............ *H04L 45/46* (2013.01); *H04L 45/26* (2013.01); *H04W 40/32* (2013.01)

(58) Field of Classification Search
CPC ......... H04L 45/04; H04L 45/02; H04L 45/48; H04L 2001/0093; H04L 41/12; H04L 45/16; H04L 45/26; H04L 61/6059; H04L 45/46; H04L 45/24; H04L 45/18; H04L 45/1283; H04L 45/124; H04W 40/24; H04W 40/248; H04W 40/246; H04W 40/32; H04W 84/18; H04W 40/10; H04W 40/02; Y02B 60/50
USPC .......... 370/255, 256, 400, 401, 408; 709/224, 709/252
See application file for complete search history.

(56) References Cited

U.S. PATENT DOCUMENTS

| 7,295,844 | B1 | 11/2007 | Moon et al. |
| 7,826,463 | B2 | 11/2010 | Patel et al. |
| 7,899,027 | B2 | 3/2011 | Castagnoli et al. |
| 7,936,681 | B2 | 5/2011 | Gong et al. |
| 7,936,732 | B2 | 5/2011 | Ho et al. |
| 8,144,596 | B2 * | 3/2012 | Veillette ........................ 370/238 |

(Continued)

FOREIGN PATENT DOCUMENTS

| WO | WO-2008001271 A3 | 4/2008 |
| WO | WO-2008068729 A1 | 6/2008 |

(Continued)

OTHER PUBLICATIONS

Finnie, et al., "Notification of Transmittal of the International Search Report and the Written Opinion of the International Search Authority, or the Declaration", Patent Cooperation Treaty, Oct. 2, 2012, 11 pages, PCT/US2012/045526, European Patent Office, Rijswijk, Netherlands.

(Continued)

*Primary Examiner* — Yee Lam
(74) *Attorney, Agent, or Firm* — Parker Ibrahim & Berg LLC; James M. Behmke; Stephen D. LeBarron

(57) ABSTRACT

In one embodiment, a non-repeated reachability probe is transmitted from a particular node into a shared-media network, where nodes that receive the probe are configured to reply to the particular node. Based on determining a set of one or more nodes in the shared-media network that received the probe, one or more routing nodes of the set may be selected to act as routers in the shared-media network, and notified of their selection.

19 Claims, 10 Drawing Sheets

(56) References Cited

U.S. PATENT DOCUMENTS

| | | | |
|---|---|---|---|
| 8,346,816 B2* | 1/2013 | Son et al. .................. | 707/803 |
| 8,385,336 B2* | 2/2013 | Fujiwara et al. ........... | 370/389 |
| 8,509,109 B2* | 8/2013 | Guo et al. .................. | 370/252 |
| 2006/0189343 A1* | 8/2006 | Park .......................... | 455/522 |
| 2009/0010190 A1 | 1/2009 | Gong | |
| 2010/0128653 A1* | 5/2010 | Tateson ..................... | 370/315 |
| 2011/0116389 A1* | 5/2011 | Tao et al. ................... | 370/252 |
| 2011/0176416 A1* | 7/2011 | Bhatti et al. ................ | 370/230 |

FOREIGN PATENT DOCUMENTS

| | | |
|---|---|---|
| WO | WO-2008119948 A1 | 10/2008 |
| WO | WO-2009067251 A1 | 5/2009 |

OTHER PUBLICATIONS

Heinzelman, et al., "An Application-Specific Protocol Architecture for Wireless Microsensor Networks", IEEE Transactions on Wireless Communications, vol. 1, No. 4, Oct. 2002, pp. 660-670.

* cited by examiner

DYNAMIC ENABLING OF ROUTING DEVICES IN SHARED-MEDIA COMMUNICATION NETWORKS

TECHNICAL FIELD

The present disclosure relates generally to computer networks, and, more particularly, to shared-media networks, such as power-line communication (PLC) networks used for example in Smart Grid and Advanced Metering Infrastructure (AMI) technologies.

BACKGROUND

Shared-media communication networks, such as power-line communication (PLC) networks (a type of communication over power-lines), provide an enabling technology for networking communication and can be used for example in AMI networks, and are also useful within home and buildings. Interestingly, PLC lines share many characteristics with low power radio (wireless) technologies. In particular, though each device in a given PLC network may each be connected to the same physical power-line, a PLC link is very much a multi-hop link, and connectivity is highly unpredictable, thus requiring multi-hop routing when the signal is too weak. For instance, even in a building the average number of hops is between two and three (even larger when having to cross phases), while on an AMI network, on the same power phase line, the number of hops may vary during a day between one and 15-20. Those skilled in the art would recognize that due to various reasons, including long power lines, interferences, etc., a PLC commendation may traverse multiple hops. In other words, PLC cannot be seen as a "flat wire" equivalent to broadcast media (such as Ethernet), since they are multi-hop networks by essence.

One of the main challenges, though, is to determine placement of routers in the shared-media networks. Indeed, consider the case of the PLC line to which a few hundreds of meters are connected (e.g., the number of meters may vary between five and more than one thousand). Signal attenuation and interferences can lead to the need to regenerate the signal, which should of course not be performed by all nodes, or else congestion, delays and collisions may occur.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a non-repeated reachability probe is transmitted from a particular node into a shared-media network, where nodes that receive the probe are configured to reply to the particular node. Based on determining a set of one or more nodes in the shared-media network that received the probe, one or more routing nodes of the set may be selected to act as routers in the shared-media network, and notified of their selection.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth. Correspondingly, a reactive routing protocol may, though need not, be used in place of a proactive routing protocol for smart object networks.

Figure 1:
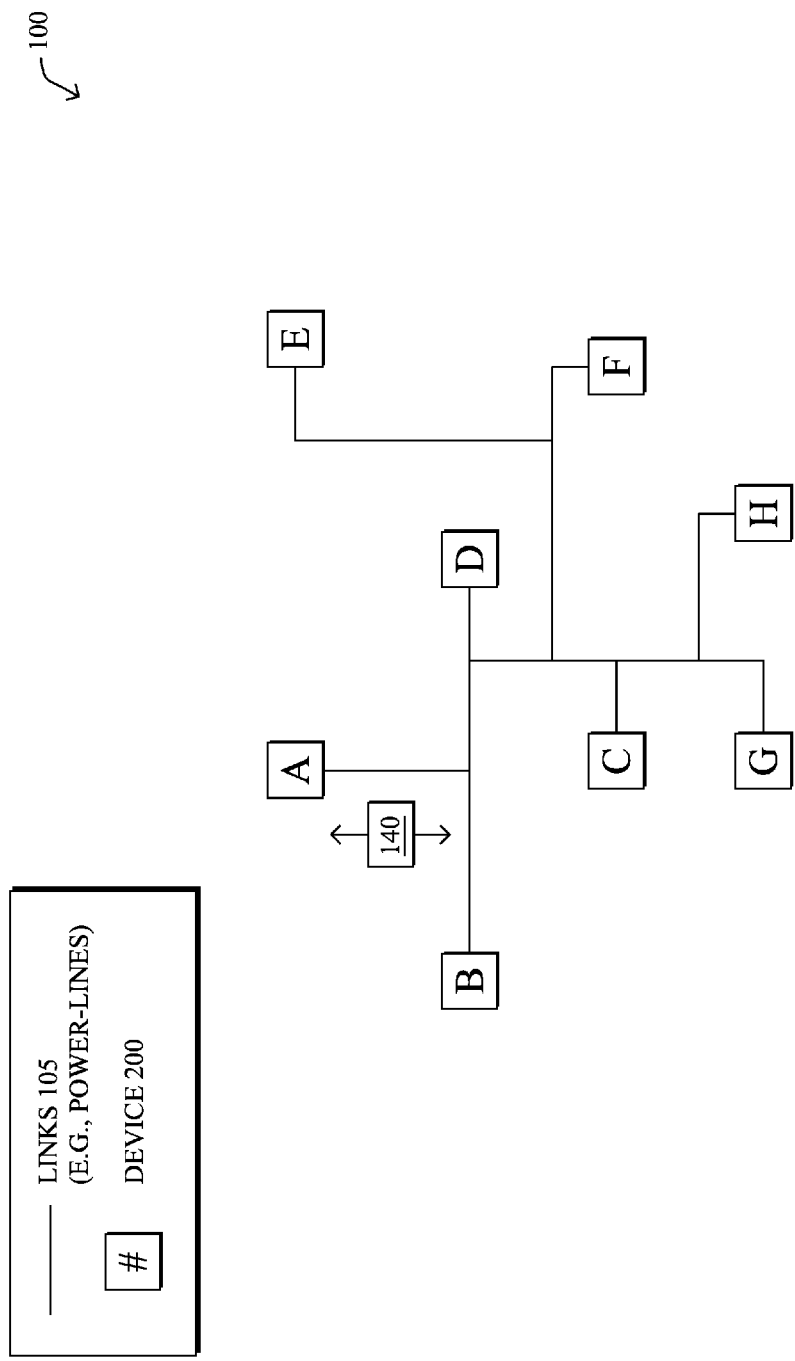
FIG. 1 illustrates an example communication network.

FIG. 1 is a schematic block diagram of an example computer network 100 illustratively comprising nodes/devices 200 (e.g., labeled as shown, "A" through "H", and described in FIG. 2 below) interconnected by various methods of communication. For instance, the links 105 may be shared media (e.g., wireless links, PLC links, etc.), where certain nodes 200, such as, e.g., routers, sensors, computers, etc., may be in communication with other nodes 200, e.g., based on distance, signal strength, current operational status, location, etc.

Those skilled in the art will understand that any number of nodes, devices, links, etc. may be used in the computer network, and that the view shown herein is for simplicity.

Data packets 140 (e.g., traffic and/or messages sent between the devices/nodes) may be exchanged among the nodes/devices of the computer network 100 using predefined network communication protocols such as certain known wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
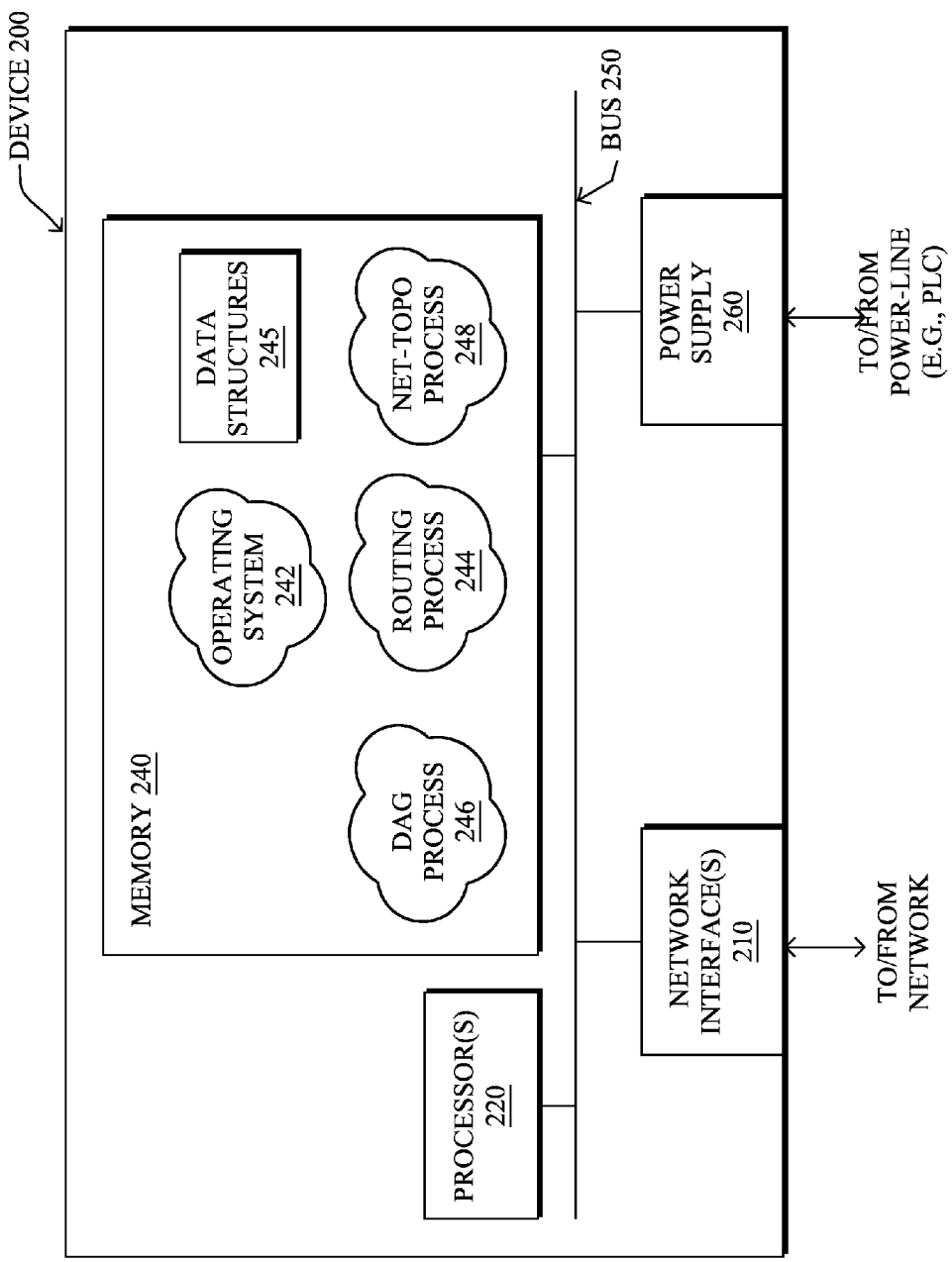
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise necessary elements or logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244, a directed acyclic graph (DAG) process 246, and an illustrative network topology ("net-topo") process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Also, a directed acyclic graph (DAG) is a directed graph having the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Note also that a tree is a kind of DAG, where each device/node in the DAG generally has one parent or one preferred parent. DAGs may generally be built (e.g., by DAG process 246 and/or routing process 244) based on an Objective Function (OF). The role of the Objective Function is generally to specify rules on how to build the DAG (e.g. number of parents, backup parents, etc.).

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

As further noted above, shared-media communication networks, particularly PLC networks, provide an enabling technology (for example) for Smart Grid and AMI networks, and are also useful within home and buildings. PLC lines share many characteristics with low power radio (wireless) technologies. In particular, though each device in a given PLC network may be connected to the same physical power-line, a PLC path may comprise of multi-hop PLC links, and connectivity is highly unpredictable, thus requiring multi-hop routing when for example the signal is too weak or in presence of interferences.

Figure 3:
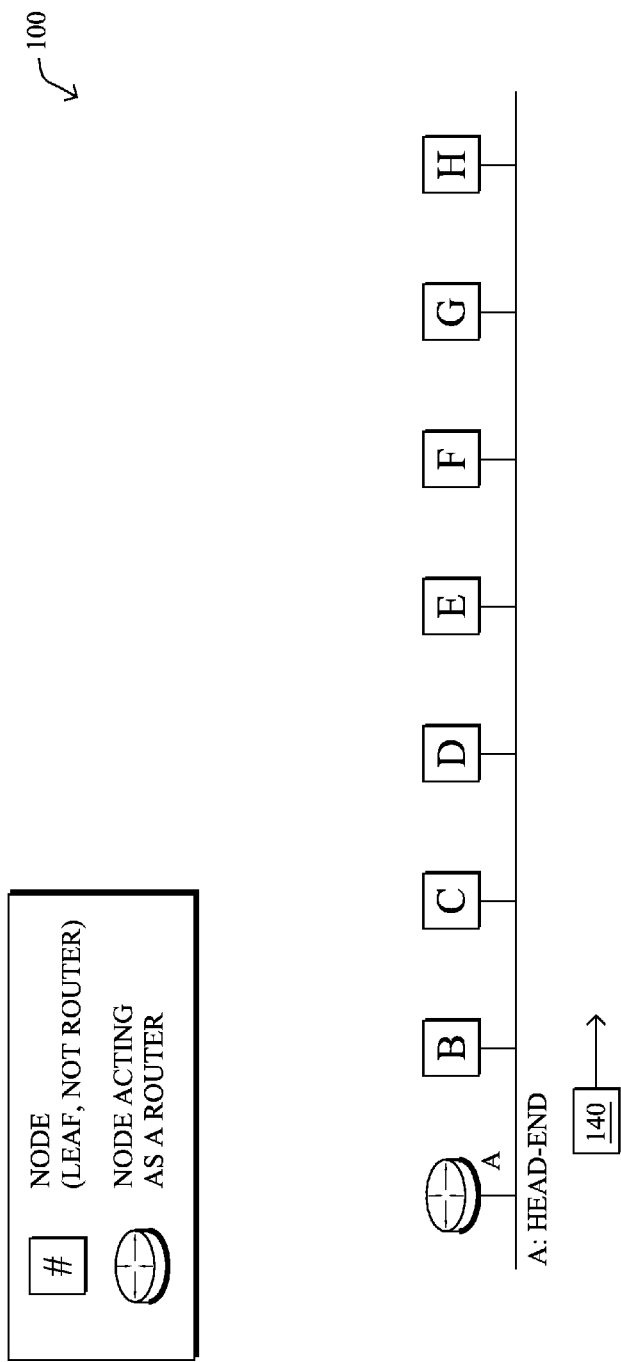
FIG. 3 illustrates an example view of the communication network with respect to power-line communication (PLC)

For example, FIG. 3 illustrates an alternate view of the network 100 in FIG. 1, where each of the nodes A-H is connected to a shared power-line, and communicates via PLC. Assuming node A transmits a message 140 into the network, there is no guarantee that the message 140 will reach the intended recipient (e.g., node H) directly, and one of the intermediate nodes (e.g., nodes B-G) may need to regenerate the message 140. As previously stated, one of the main challenges in shared-media networks is to determine placement of such routers in the shared-media networks. That is, a primary challenge is to determine which nodes should act as routers, thus regenerating the signal, while trying to minimize the number of needed routers so as to minimize processing delays, network usage, and collisions.

Dynamic Enabling of Routers

The techniques herein are generally directed to a probing technique used to determine which nodes connected to the shared-media network, e.g., PLC line, should act as a router in a fully dynamic fashion before triggering the building of a dynamic routing topology (e.g., a DAG using a routing protocol such as RPL). Illustratively, the techniques attempt to find a minimum number of required nodes that MUST act as router in order to reach all of the nodes in the network.

Specifically, according to one or more embodiments of the disclosure as described in detail below, a non-repeated reachability probe is transmitted from a particular node (e.g., a head-end node) into the shared-media network, where nodes that receive the probe are configured to reply to the particular node. Based on determining a set of one or more nodes in the shared-media network that received the probe, one or more routing nodes of the set may be selected to act as routers in the shared-media network, and notified of their selection.

Illustratively, the techniques described herein may be performed by hardware, software, and/or firmware, such as in accordance with the "net-topo" process 248, which may contain computer executable instructions executed by the processor 220 to perform functions relating to the novel techniques described herein, e.g., in conjunction with routing process 244 (and/or DAG process 246). For example, the techniques herein may be treated as extensions to conventional protocols, such as the various PLC protocols or wireless communication protocols, and as such, may be processed by similar components understood in the art that execute those protocols, accordingly.

Operationally, the techniques herein may be initiated by a head-end node (e.g., data concentrator for AMI PLC or the data collection engine in a house/building). In one or more embodiments herein, the head-end node, e.g., node A, may start a probing cycle in response to a trigger. For example, such triggers may include the expiration of a configurable timer, a received alarm at the data collection engine reporting that the number of unreachable nodes have exceeded a preconfigured threshold, etc. For instance, the probing technique may be called upon based on the occurrence of other various events such as being required to increase the number of routers on the PLC power line because the link quality has degraded below a particular threshold, one or more devices or other equipment has been added to or removed from the network, e.g., that may create detectable perturbations, etc. Note that it may also be beneficial to trigger the process on a regular (periodic) basis because PLC link characteristics do change over time.

The techniques described herein, in particular, are responsible for determining the minimum number of nodes that should act as routers in the network to ensure that all nodes remains connected. Note that the motivation for limiting the number of nodes acting as routers in the networks are 1) to limit power consumption (a node acting as a leaf performs much less processing than a node acting as a router) which is of the utmost importance even if nodes are powered from the power line, 2) to ensure that the nodes are all connected, and 3) to limit the number of hops and thus reduce the overall packet delay and the network utilization.

Figure 4:
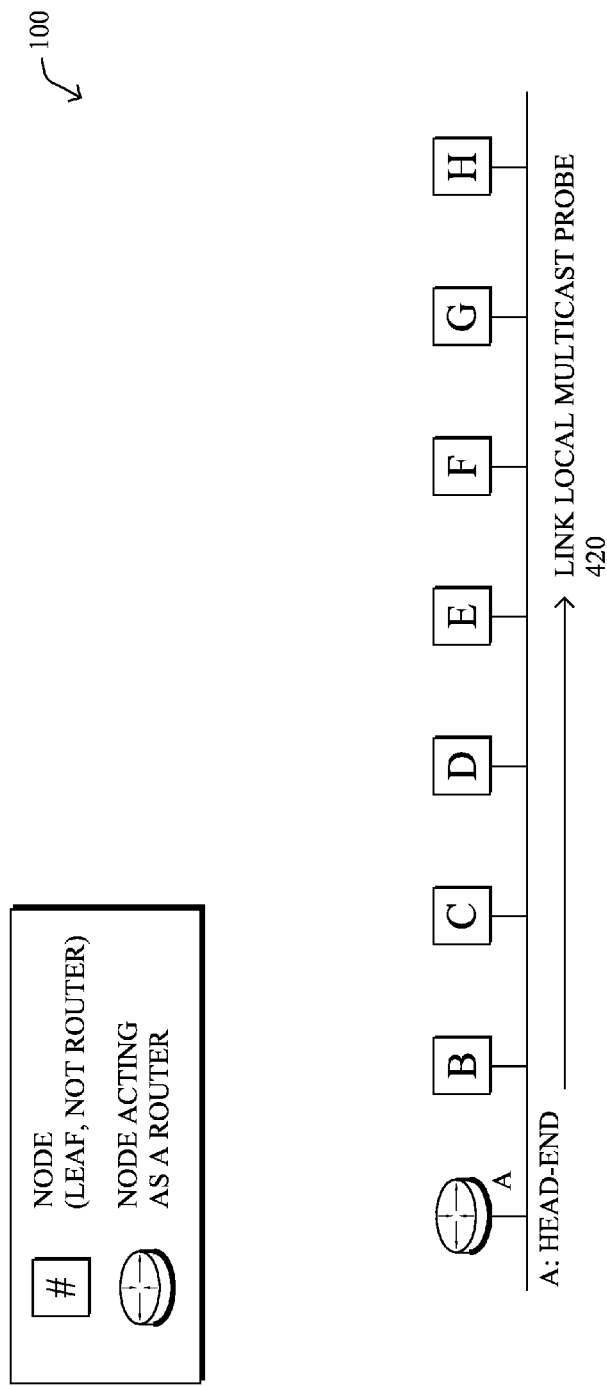
FIGS. 4-8 illustrate examples of message passing in the communication network and the progressive selection of routing devices.

The net-topo process 248 may start on a particular node, e.g., a head-end node (node A), by first transmitting a non-repeated reachability probe into the shared-media network 100. FIG. 4 illustrates an example probe 420 that may be sent into the network by the head-end, and may be illustratively embodied as a newly defined IPv6 message sent using an IPv6 link local address to prevent repetition into the network. (Other techniques may also be used, such as time-to-live counters, etc.)

Figure 5:
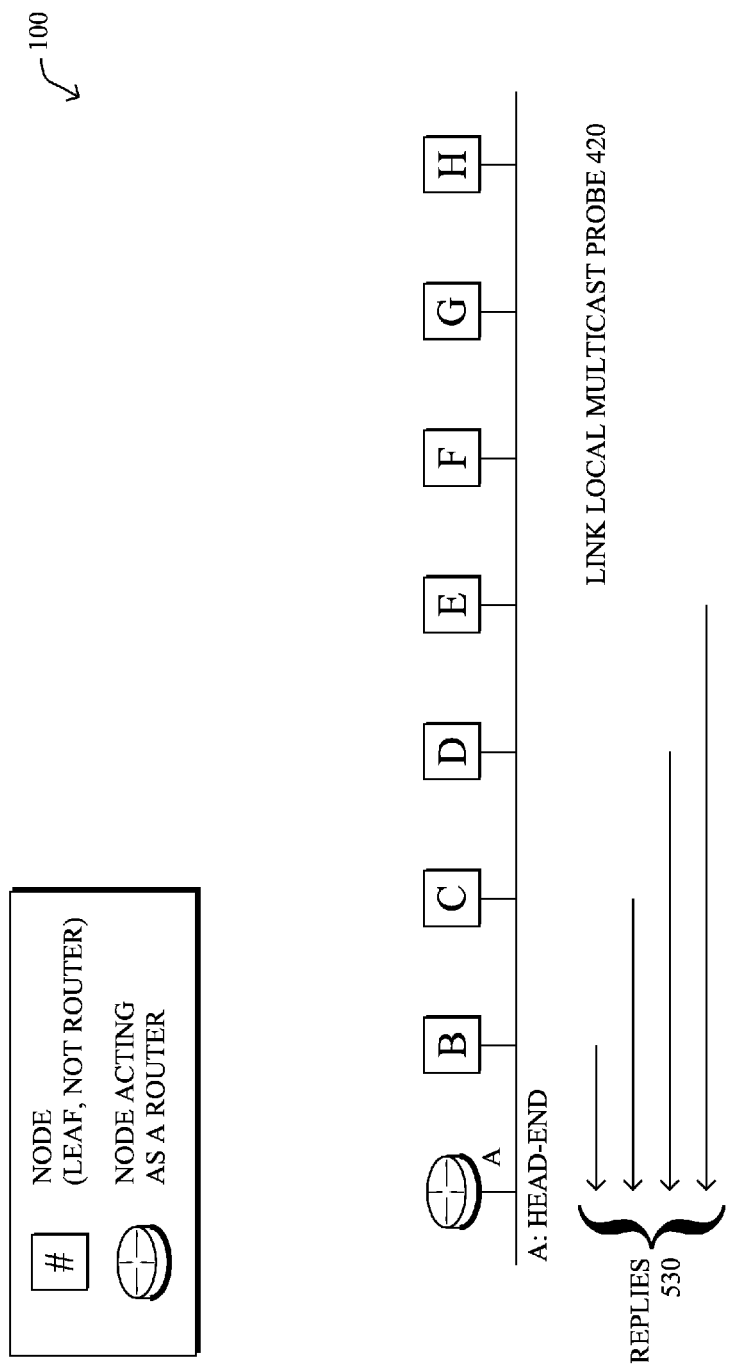

Nodes that receive the probe on the shared-media network are configured to reply to the particular node by returning an acknowledgment 530 (shown in FIG. 5) to the head-end after adding its own address. After this first round, the head-end constructs a list of nodes which are directly reachable without regenerating the signal (i.e., determining the set of one or more single-hop reachable nodes or direct neighbors that received the probe 420). Note that there is generally no way to learn the relative geographical positioning of the nodes through probing on the shared-media network, since the probing node simply sends messages into the network, and receives replies. Referring the FIG. 5, assume that the head-end gets an "ack" message 530 to its probe from nodes B, C, D and E.

At this stage the head-end node A may select a number of nodes that will act as routers. The selection of which nodes to act as routers may be random, based on certain node capabilities (e.g., known ahead of time, or else relayed in the ack message 530), or other selection algorithms, such as based on signal strength, etc. Note that the selection of multiple nodes may be useful to add redundancy to the routing architecture. Note also that the number of nodes selected as a router may be dynamically adjusted based on one or more network conditions, such as based on observing the number of times nodes get disconnected after a node failure in the network (thanks to historical data), monitoring link degradation, updated objective functions (OFs), etc.

Figure 6:
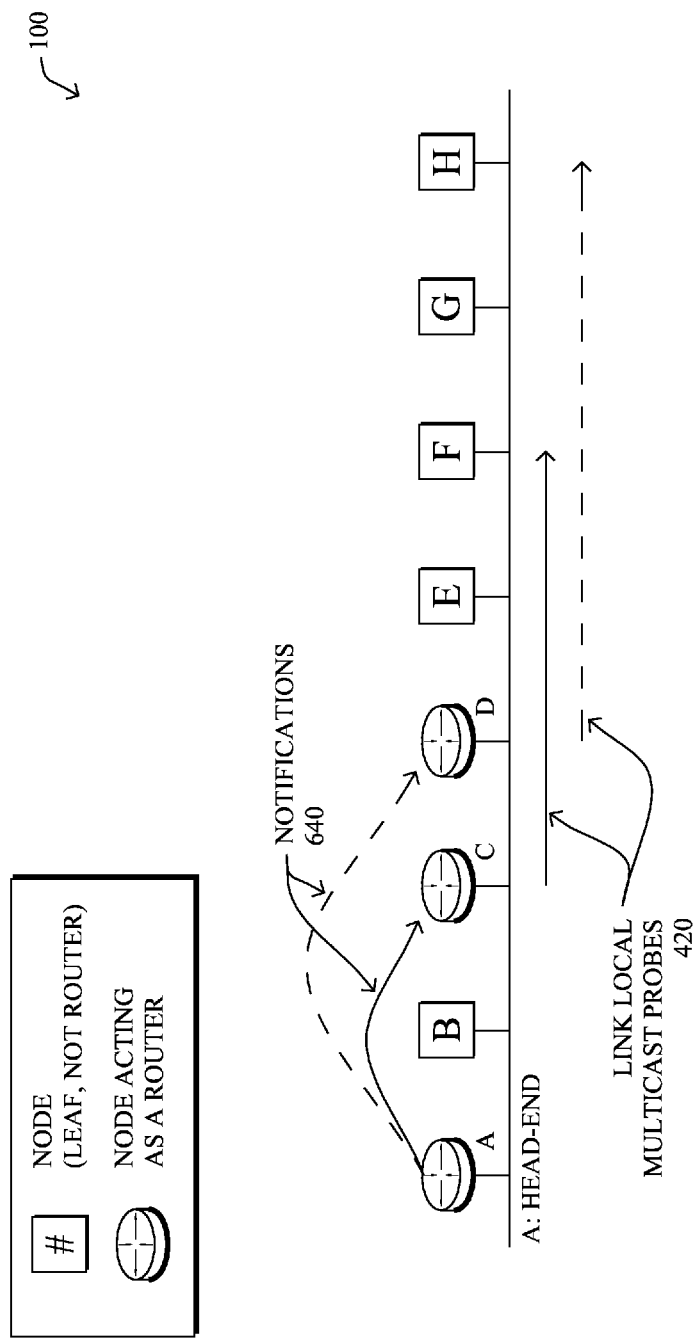
Figure 7:
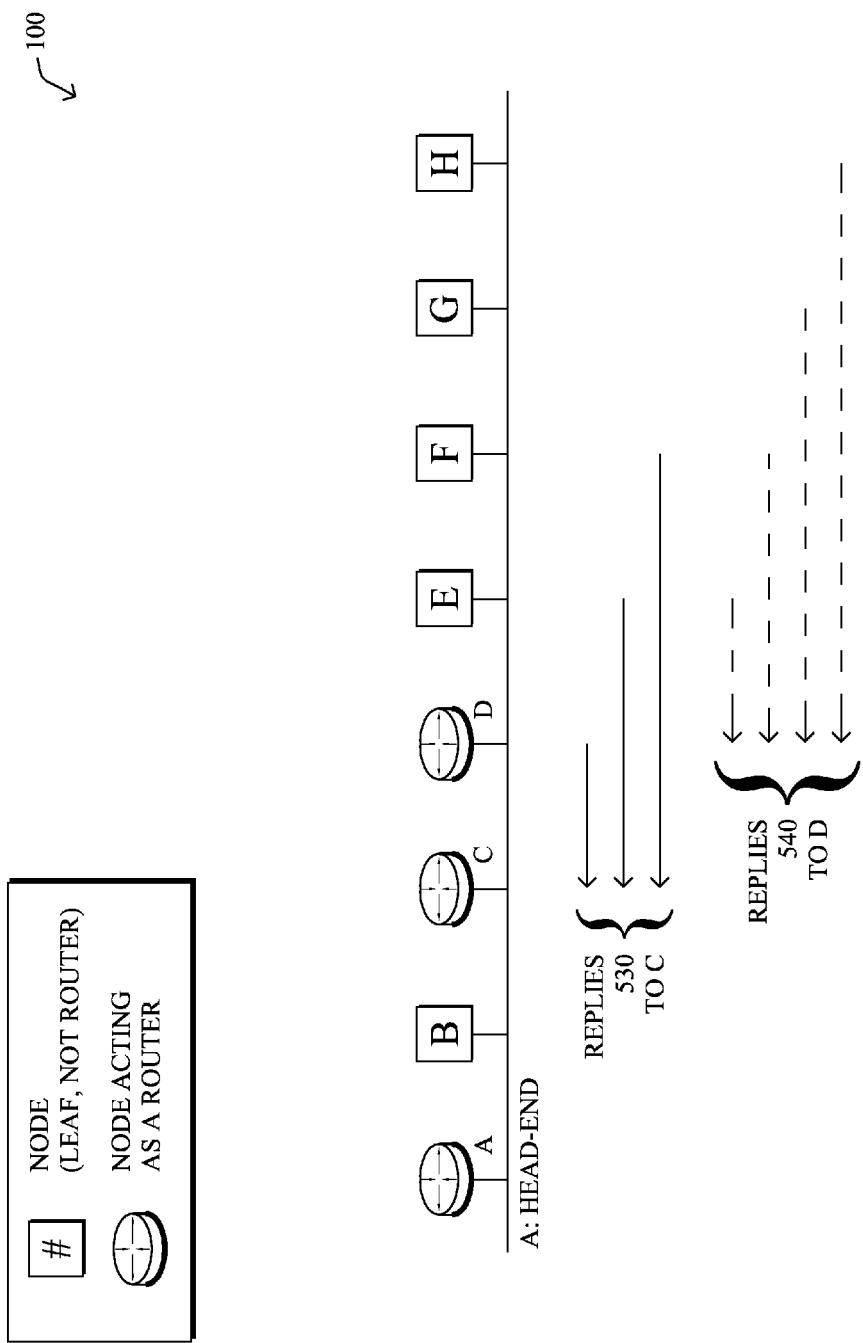

In this example, nodes C and D may be selected as routers. The head-end may then send a request to the selected node, notifying the selected routing nodes of their selection. For instance, as shown in FIG. 6, notifications 640 may be sent to the selected routing nodes, requesting that the selected routing nodes send out a corresponding non-repeating reachability probe 420 into the shared-media network, for which further replies 530 as shown in FIG. 7 may be received by those selected routing nodes from the reachable nodes, accordingly. In this manner, the selected routing nodes repeat the process, thus continuing to propagate additional probes in order to recursively determine the set of reachable nodes and to select additional routers to reach further and further into the shared-media network.

In particular, in one embodiment, the selected routing nodes may report back to the head-end node the list of reachable nodes in response to the propagated probes 420. Upon receiving this set of nodes (the ones that received the additional probe), in this embodiment, the head-end node may select one or more additional routing nodes of this set to act as routers, and notifies them (via the previously selected routers) of their selected responsibility as routers themselves.

Alternatively, in another embodiment, the head-end node (and each selected router during its propagation round) may request that the selected routing nodes select and notify a corresponding second set of nodes to act as routers in the shared-media network based on receipt of the second probe, and then a third selected routing device may select and notify its own further set of routing devices, etc. Note that in this embodiment, care should be taken to avoid "back-tracking" into the network, such as node D selecting node B as a router if node B replies to node D's probe. This may be prevented, for example, by having node B not reply if it has already (under the assumption that an earlier received probe is a closer probe to the head-end node), or by having node B reply with an indication that it has already replied, etc.

Figure 8:
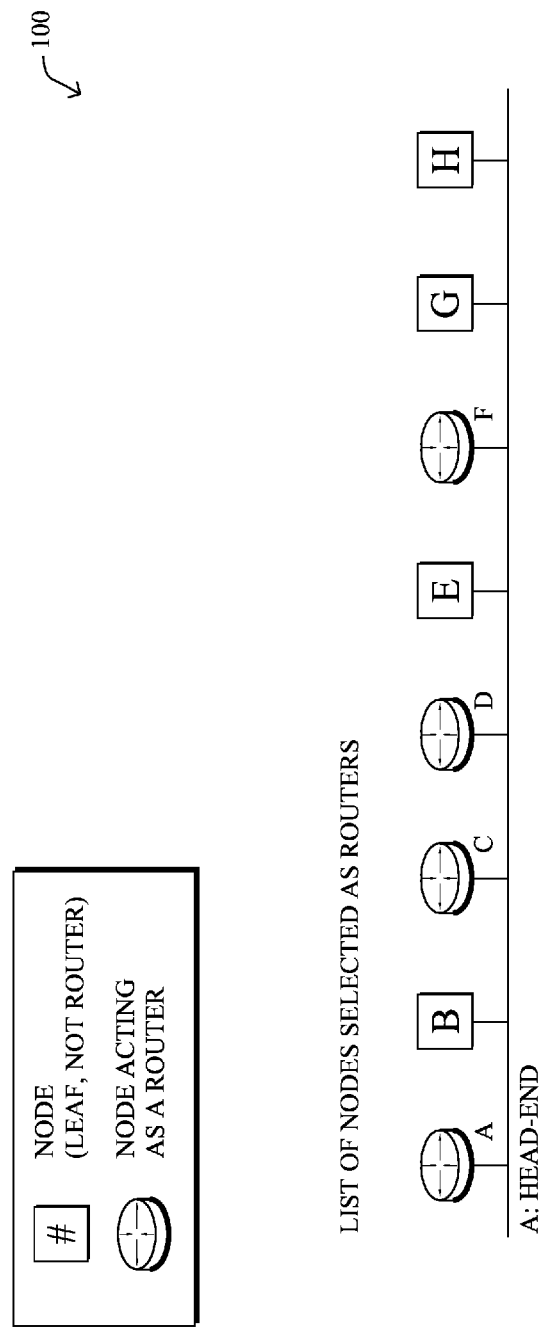

As shown in FIG. 8, upon completion of the recursive probing, the lists of nodes reachable from each one of the nodes selected as routers is as follows:
  From node A: nodes B, C, D, and E are reachable. Illustratively, nodes C and D are selected as routers.
  From node C: nodes D, E, and F are reachable. Illustratively, node F may be selected as a router.
  From node D: nodes E, F, G, and H are reachable.

Note that node F may also transmit probes into the network, but it may be determined that no additional nodes are discovered, and hence no further nodes need be selected as routers. Note also that the random selection of routers may not always result in reachability to every node in the shared-media network. For this reason, in one specific embodiment, it may be beneficial to first determine all nodes in the network (e.g., by transmitting a repeated reachability probe into the network), such that selection of the routing nodes may be made to ensure reachability to all nodes. In particular, if it is determined that certain nodes are not reachable based on a current router selection, the selected routers may be changed, and the techniques may follow a different router path in an attempt to reach the previously unreachable nodes. In other words, the head-end node may restart the process upon the detection of one or more isolated nodes in the network.

Once the routers have all been selected in the network 100, and the necessary nodes (e.g., all) are reachable via multi-hop paths from the head-end node, the head-end node may start to build/create a directed acyclic graph (DAG) based on the selected routing nodes, e.g., using the RPL protocol. For instance, as will be understood by those skilled in the art, the head-end node may send DAG (or "DODAG") Information Object (DIO) messages into the network, and each node selected as a router may further propagate its own DIO deeper into the network.

Figure 9:
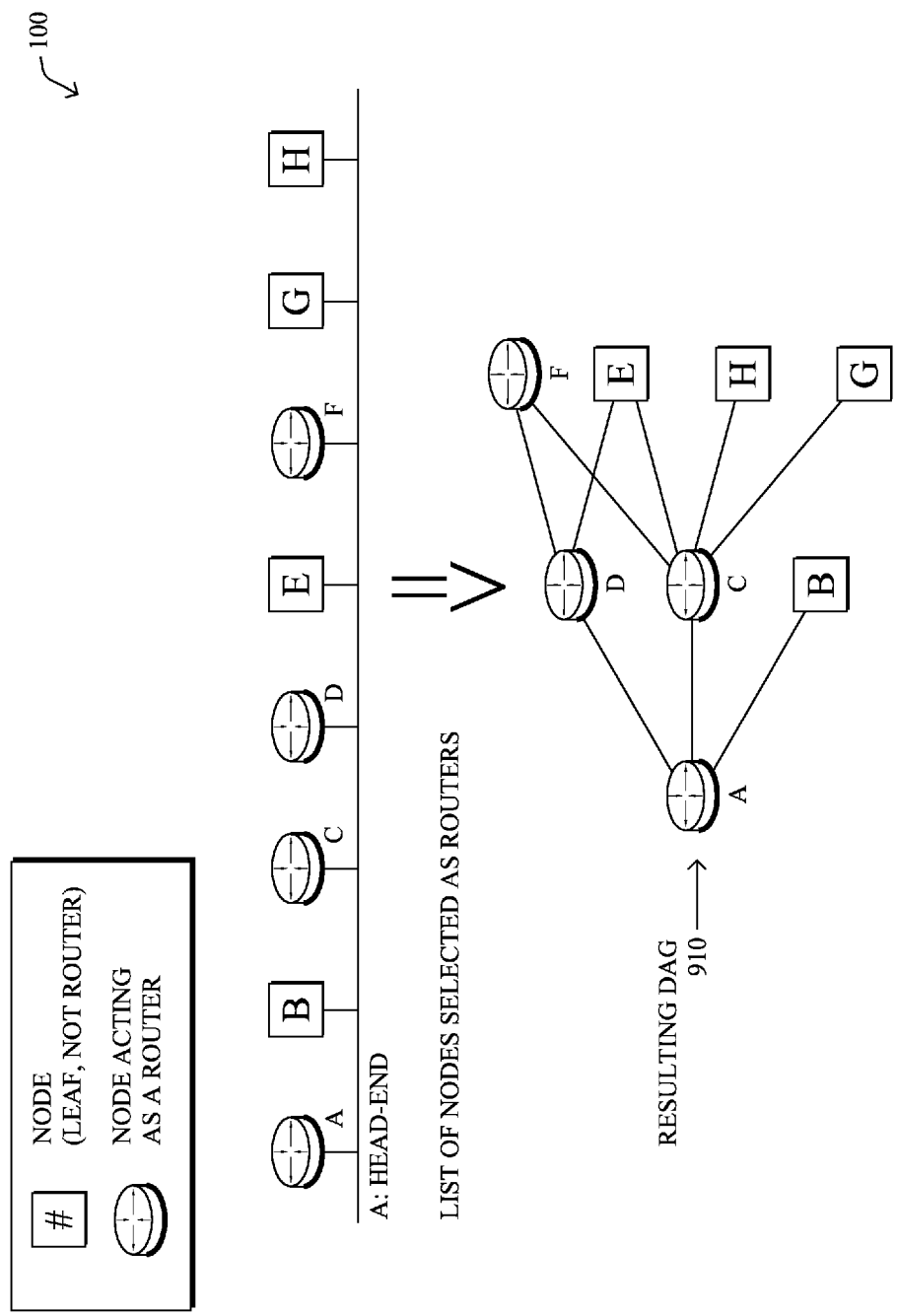
FIG. 9 illustrates an example directed acyclic graph (DAG) in the communication network based on the selected routing nodes in FIG. 8.

FIG. 9 illustrates an example end-result DAG 910 as shown, based on the selected routing devices and their connectivity (reachability) to other nodes. Note that while the embodiments are shown herein with reference to a generally "tree" shaped network, the description herein is not so limited, and may be applied to any type of suitable networks, such as those that have branches emitting to all directions with the root node generally centralized among a plurality of surrounding nodes. As changes are made to the selected routing nodes and/or to the reachability between such nodes, so, too, does the DAG shape change, accordingly. Note that the resulting tree of FIG. 9 may be further optimized by node F realizing that it has no other leafs dependent on it, and therefore need not act as a router. Optionally, node F may retransmit a probe message every so often as to test whether there is any other node which requires its services as a router.

Figure 10:
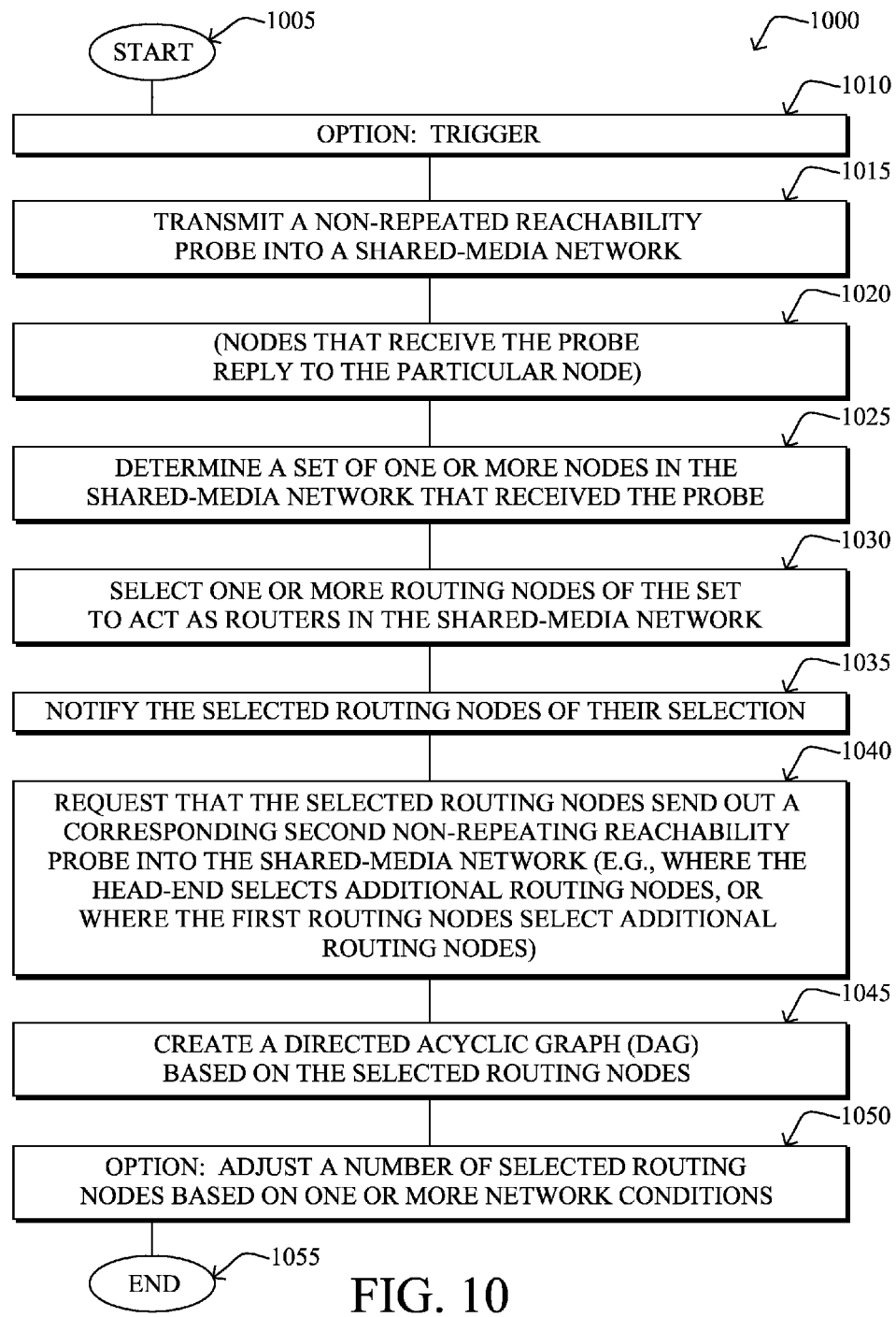
FIG. 10 illustrates an example simplified procedure for dynamically enabling routing devices in a shared-media communication network.

FIG. 10 illustrates an example simplified procedure for dynamically enabling routing devices in a shared-media communication network in accordance with one or more embodiments described herein. The procedure 1000 starts at step 1005, and, optionally in response to a trigger as mentioned above in step 1010, continues to step 1015, where a particular node (e.g., head-end node A) transmits a non-repeated reachability probe 420 into a shared-media network 100. In step 1020, various nodes that receive the probe may reply to the particular node (replies 530), such that in step 1025, the particular node may determine a set of one or more nodes in the shared-media network that received the probe (and are thus directly reachable). From this set, in step 1030 the particular node may select one or more routing nodes of the set to act as routers in the shared-media network, and notifies the selected routing nodes of their selection in step 1035.

In step 1040, the particular node may generally request that the selected routing nodes send out a corresponding second non-repeating reachability probe 420 into the shared-media network, such as in the notification 640. As described in greater detail above, the network may be configured to either have the head-end node select additional routing nodes, or to have each of the first routing nodes select additional routing nodes. Regardless of the technique used to propagate the router selection throughout the network, in step 1045 a DAG 910 may be created based on the selected routing nodes.

Optionally, the number of selected routing nodes may be adjusted in step 1050 based on one or more network conditions, as described above, or other triggers may prompt the return to step 1010 to re-select routing nodes in the network. The procedure ends in step 1055. It should be noted, generally, that FIG. 10 is merely an example for illustration, and is not meant to be limiting to the scope of the embodiments herein. For instance, while certain steps within the procedure 1000 may be optional as described above, certain steps may be included or excluded as desired. Further, while a particular order of the steps is shown, this ordering is merely illustrative, and any suitable arrangement of the steps may be utilized without departing from the scope of the embodiments herein.

The novel techniques described herein, therefore, provide for dynamic enabling of routing devices in a shared-media communication network. In particular, the techniques herein dynamically determine which nodes in a shared-media (e.g., PLC) network should act as a router in a fully dynamic fashion, a particularly difficult task in a complex PLC network. The techniques may also then trigger the building of a dynamic routing topology, for example, a DAG by using a routing protocol such as RPL.

While there have been shown and described illustrative embodiments that provide for dynamic enabling of routing devices in a shared-media communication network, it is to be understood that various other adaptations and modifications may be made within the spirit and scope of the embodiments herein. For example, the embodiments have been shown and described herein with relation to PLC networks. However, the embodiments in their broader sense are not as limited, and may, in fact, be used with other types of shared-media networks and/or protocols (e.g., wireless). In addition, while certain protocols are shown, such as RPL, other suitable protocols may be used, accordingly. Also, while the techniques generally describe initiation and determinations by a head-end node (node A), a network management system/server (NMS) may also be used to provide intelligence to the network functions described herein, such that the NMS initiates the first probe 420 into the network, and may select which nodes to act as routers, etc.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   transmitting a non-repeated reachability probe from a particular node into a shared-media network, the shared-media network connecting a plurality of nodes, wherein nodes that receive the non-repeated reachability probe are configured to reply to the particular node;
   determining a set of one or more nodes in the shared-media network that received the non-repeated reachability probe;
   determining, at the particular node, a minimum number of required nodes of the plurality of nodes that must act as routers in order to reach each of the plurality of nodes in the shared-media network;
   selecting, by the particular node, one or more routing nodes of the set of one or more nodes to act as the routers in the shared-media network based on the minimum number of required nodes;
   notifying, by the particular node, the selected one or more routing nodes of the one or more routing nodes of their selection;
   subsequently, dynamically adjusting, by the particular node, the minimum number of required nodes of the plurality of nodes that are selected as the one or more routing nodes of the set of one or more nodes based on network conditions; and
   wherein the steps of the transmitting the non-repeated reachability probe and the selecting the one or more routing nodes in response to a trigger selected from a group consisting of: a timer; determination that a number of unreachable nodes in the shared-media network has exceeded a first threshold; a determination that link quality in the shared-media network is below a second threshold; a detection of network perturbations; one or more new devices in the shared-media network; one or more of the one or more routing nodes are removed from the shared-media network; and a detection of one or more isolated nodes in the shared-media network.

2. The method as in claim 1, further comprising:
   requesting that the selected one or more routing nodes send out a corresponding second non-repeating reachability probe into the shared-media network.

3. The method as in claim 2, further comprising:
   receiving, at the particular node from a routing node of the selected routing nodes, a second set of one or more nodes in the shared-media network that received the second non-repeated reachability probe;
   selecting one or more second routing nodes of the second set of one or more nodes to act as the routers in the shared-media network; and
   notifying the selected second routing nodes of their selection.

4. The method as in claim 2, further comprising:
   requesting that the selected one or more routing nodes select and notify a second set of nodes to act as the routers in the shared-media network based on receipt of the second non-repeated reachability probe.

5. The method as in claim 1, wherein the shared-media network is a power-line communication (PLC) network.

6. The method as in claim 1, wherein the particular node is a head-end node in the shared-media network.

7. The method as in claim 1, wherein the particular node is a routing node of the one or more routing nodes in the shared-media network having received notification that was selected as a router.

8. The method as in claim 1, further comprising:
   determining, in advance, the each of the plurality of nodes in the shared-media network; and
   selecting the one or more routing nodes to ensure reachability to the each of the plurality of nodes.

9. The method as in claim 8, further comprising:
   transmitting a repeated reachability probe into the shared-media network to determine identify the each of the plurality of nodes in the network.

10. The method as in claim 1, further comprising:
    creating a directed acyclic graph (DAG) based on the selected one or more routing nodes.

11. An apparatus, comprising:
    one or more network interfaces to communicate in a shared-media computer network;
    a processor coupled to the one or more network interfaces and adapted to execute one or more processes; and
    a memory configured to store a process executable by the processor, the process when executed operable to:
    transmit a non-repeated reachability probe into the shared-media network, the shared-media network connecting a plurality of nodes, wherein nodes that receive the non-repeated reachability probe are configured to reply to the particular node;
    determine a set of one or more nodes in the shared-media network that received the non-repeated reachability probe;
    determine a minimum number of required nodes of the plurality of nodes that must act as routers in order to reach each of the plurality of nodes in the shared-media network;
    select one or more routing nodes of the set of one or more nodes to act as the routers in the shared-media network based on the minimum number of required nodes;
    notify the selected one or more routing nodes of the one or more nodes of their selection;
    subsequently, dynamically adjust the minimum number of required nodes of the plurality of nodes that are selected as the one or more routing nodes of the set of one or more nodes based on network conditions; and
    wherein the steps of the transmit the non-repeated reachability probe and the select the one or more routing nodes in response to a trigger selected from a group consisting of: a timer; determination that a number of unreachable nodes in the shared-media network has exceeded a first threshold; a determination that link quality in the shared-media network is below a second threshold; a detection of network perturbations; one or more new devices in the shared-media network; one or more of the one or more routing nodes are removed from the shared-media network; and a detection of one or more isolated nodes in the shared-media network.

12. The apparatus as in claim 11, wherein the process when executed is further operable to:

request that the selected one or more routing nodes send out a corresponding second non-repeating reachability probe into the shared-media network.

13. The apparatus as in claim 12, wherein the process when executed is further operable to:
propagate the selection of routing nodes in the shared-media network by one of either:
a) receiving, from a routing node of the selected routing nodes, a second set of one or more nodes in the shared-media network that received the second non-repeated reachability probe; selecting one or more second routing nodes of the second set of one or more nodes to act as the routers in the shared-media network; and notifying the selected second routing nodes of their selection; and
b) requesting that the selected one or more routing nodes select and notify the
second set of one or more nodes to act as the routers in the shared-media network based on receipt of the second non-repeated reachability probe.

14. The apparatus as in claim 11, wherein the shared-media network is a power-line communication (PLC) network.

15. The apparatus as in claim 11, wherein the process when executed is further operable to:
create a directed acyclic graph (DAG) based on the selected one or more routing nodes.

16. A tangible, non-transitory, computer-readable media having software encoded thereon, the software when executed by a processor operable to:
transmit a non-repeated reachability probe into the shared-media network, wherein nodes that receive the non-repeated reachability probe are configured to reply to the particular node;
determine a set of one or more nodes in the shared-media network that received the non-repeated reachability probe;
determine a minimum number of required nodes of the plurality of nodes that must act as routers in order to reach each of the plurality of nodes in the shared-media network;
select one or more routing nodes of the set of one or more nodes to act as the routers in the shared-media network based on the minimum number of required nodes;
notify the selected one or more routing nodes of the one or more nodes of their selection;
subsequently, dynamically adjust the minimum number of required nodes of the plurality of nodes that are selected as the one or more routing nodes of the set of one or more nodes based on network conditions; and
wherein the steps of the transmit the non-repeated reachability probe and the select the one or more routing nodes in response to a trigger selected from a group consisting of: a timer; determination that a number of unreachable nodes in the shared-media network has exceeded a first threshold; a determination that link quality in the shared-media network is below a second threshold; a detection of network perturbations; one or more new devices in the shared-media network; one or more of the one or more routing nodes are removed from the shared-media network; and a detection of one or more isolated nodes in the shared-media network.

17. The tangible, non-transitory, computer-readable media as in claim 16, wherein the software when executed is further operable to:
request that the selected one or more routing nodes send out a corresponding second non-repeating reachability probe into the shared-media network.

18. The tangible, non-transitory, computer-readable media as in claim 17, wherein the software when executed is further operable to:
propagate the selection of routing nodes in the shared-media network by one of either:
a) receiving, from a routing node of the selected routing nodes, a second set of one or more nodes in the shared-media network that received the second non-repeated reachability probe; selecting one or more second routing nodes of the second set to act as the routers in the shared-media network; and notifying the selected second routing nodes of their selection; and
b) requesting that the selected one or more routing nodes select and notify the second set of one or more nodes to act as the routers in the shared-media network based on receipt of the second non-repeated reachability probe.

19. The tangible, non-transitory, computer-readable media as in claim 16, wherein the software when executed is further operable to:
create a directed acyclic graph (DAG) based on the selected one or more routing nodes.

* * * * *